US006711739B1

(12) United States Patent
Kutcher

(10) Patent No.: US 6,711,739 B1
(45) Date of Patent: Mar. 23, 2004

(54) SYSTEM AND METHOD FOR HANDLING THREADS OF EXECUTION

(75) Inventor: Jeffrey M. Kutcher, Spring, TX (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/436,792

(22) Filed: Nov. 8, 1999

(51) Int. Cl.$^7$ .......................... G06F 17/00; G06F 9/00; G06F 9/44

(52) U.S. Cl. .......................... 718/1; 718/100; 718/102; 717/114; 717/118

(58) Field of Search ................ 709/1–108; 717/100, 717/114, 116, 118, 120, 121, 123

(56) References Cited

U.S. PATENT DOCUMENTS 6,081,665 A * 6/2000 Nilsen et al. ................ 717/116
6,216,150 B1 * 4/2001 Badovinatz et al. ........ 709/106
6,330,709 B1 * 12/2001 Johnson et al. ............. 717/100

OTHER PUBLICATIONS

Sun Microsystems, Inc. "Highlighting.java". 1998, pp. 1–4.*

"Implementing the Runnable Interface", "Subclassing Thread and Overriding run", "Thread (Java 2 Platform SE v1.4.1)", "Java Thread Primitive Deprecation", "Runnable (Java 2 Platform SE v1.4.1)" ☐☐☐☐From the Java Tutorial on sun.java.com☐☐.*

Chaffee, Alex. "man.java". 1996, pp. 1–9.*

* cited by examiner

*Primary Examiner*—William Grant
*Assistant Examiner*—Syed J Ali
(74) *Attorney, Agent, or Firm*—Robert C. Kowert; Meyertons, Hood, Kivlin, Kowert & Goetzel, P.C.

(57) ABSTRACT

A mechanism for controlling threads in a Java application while avoiding the unsafe conditions inherent in the use of existing java.lang.Thread methods. In one embodiment, a first class is defined for handling threads in an application. The first class uses a target variable to indicate whether a thread should continue to run, or whether it should be stopped. This first class provides a start( ) method to set up the target variable, a stop( ) method to set the target variable to indicate that the thread should be stopped, and an abstract run( ) method. The functionality of the run( ) method is provided by one or more additional classes which extend the first class. The additional classes override the abstract run( ) method and define the tasks to be performed by threaded objects instantiated from these classes. When a thread needs to be stopped, the corresponding target variable is set to indicate that it should be stopped. The thread periodically checks the target variable and, when the target variable is set to indicate that the thread should be stopped, the thread executes one or more instructions that cause execution of the thread to complete and to exit normally.

24 Claims, 2 Drawing Sheets

SYSTEM AND METHOD FOR HANDLING THREADS OF EXECUTION

BACKGROUND OF THE INVENTION

1. Field of the Invention

The present invention relates generally to computer programming languages and more specifically to a mechanism implemented in the Java programming language for handling threads in a manner which avoids leaving the threads in unstable states when they are stopped.

2. Description of Related Art

Java is a high-level programming language which supports multi-threaded program execution. A thread is basically a separate stream of execution that can take place independently from and concurrently with other streams of execution. A thread is similar to a small program that performs particular tasks within a larger program. If, for some reason, there is a problem with the execution of the tasks performed by a particular thread, other threads may continue performing their own tasks despite this problem. For example, if one thread becomes stuck in an infinite loop, the other threads may continue and complete their processing without having to wait for the first thread to break out of the loop.

While threading is a similar to multitasking, it is typically more difficult to implement. This is due, in part, to the fact that multitasking involves individual programs that are executed in isolation from each other, while threading involves the performance of tasks which may be interrelated. For example, one thread may print the contents of certain memory locations, while another thread may write new data to those same memory locations. If the interaction between the threads is not handled properly, the results of the tasks performed by the two threads may be uncertain.

Threads can be implemented in Java by creating a subclass of java.lang.Thread, or by using the java.lang.Runnable interface. The java.lang.Thread class includes three methods which are the primary means for controlling threads: start( ), run( ) and stop( ). The start( ) method prepares the thread to be executed. The run( ) method performs the functions of the thread. The stop( ) method terminates the thread. The java.lang.Thread class also includes several other methods which are used to control the execution of instructions in a thread, including suspends, resumes, sleep( ) and yield( ).

Two of these methods are inherently problematic. It may be unsafe to use the stop( ) method because, when a thread is terminated, objects which may have been locked by the thread are all unlocked, regardless of whether or not they were in consistent states. These inconsistencies can lead to arbitrary behavior which make corrupt the functions of the thread and the program. The suspend( ) method may also cause problems because it is prone to deadlock. For example, if a thread holds a lock on the monitor for a particular resource when it is suspended, no other thread can access the resource until the thread holding the lock is resumed. If a second thread should cause the first thread to resume, but first attempts to access the resource, it may wait for access to the resource and consequently may never call the first thread's resume( ) method. Because these two methods are so problematic, their use is discouraged and they are being deprecated from the Java Developers Kit produced by Java's originator, Sun Microsystems Inc.

SUMMARY OF THE INVENTION

One or more of the problems outlined above may be solved by various embodiments of the present mechanism. The mechanism provides a means for controlling threads in a Java application while avoiding the unsafe conditions inherent in the use of existing java.lang.Thread methods. The present mechanism provides a simple and easy-to-use mechanism. for stopping threads without causing unnecessary waiting, without creating a need for exception handling, and without leaving the associated application in an unknown state.

In one embodiment, a class is defined for handling threads in an application. The class uses a target variable to indicate whether a thread should continue to run, or whether it should be stopped. This class provides a start( ) method to set up the target variable, a stop( ) method to set the target variable to indicate that the thread should be stopped, and an abstract run( ) method. An abstract method is one which is defined, but contains no functionality—the functionality of the method must be provided by subclasses which extend this class. At least one subclass is created to extend the class. The subclass overrides the abstract run( ) method and defines the tasks to be performed by threaded objects instantiated from this class.

When an object is instantiated from the subclass, the start( ) method inherited from the class is configured to create a thread having the object as its target. The start( ) method is also configured to set the target variable (which is local to the thread) is set to a value which indicates that the thread should be running. The stop( ) method of the class is also inherited by the subclass. When the stop( ) method is invoked, it is configured to set the target variable to a value which indicates that the thread should be stopped. The run( ) method provided by the subclass periodically checks the target variable within the thread. The checking of the target variable occurs in the normal course of execution of the run method. If the target variable indicates that the thread should be stopped, the run( ) method is configured to complete execution and exit normally, causing the thread to terminate. An exception is not required to stop the run( ) method, so exception handling is not necessary.

In one embodiment, a computer readable storage medium contains instructions defining the class and subclasses described above.

In one embodiment, a thread-handling method is provided for improved handling of threads in Java applications. Broadly speaking, the method comprises providing a class that includes methods for stopping threads based on the indication of a target variable. Instructions that are to be executed within threads are provided in the run( ) methods of subclasses that extend the first class. Rather than creating threads from the standard Thread class and individually configuring the threads to stop execution upon the occurrence of a particular condition, threads are created using the subclasses above. The safer methods which are inherited from these subclasses override the methods of the Thread class so that stopping threads is inherently safer. When a thread is created, the target variable is initialized to indicate that the thread should be running. The instructions being executed by the thread periodically check the target variable to determine whether it indicates that the thread should continue running, or should stop. If the target variable indicates that the thread should continue running, the thread executes normally until the target variable is checked again. If the target variable indicates that the thread should be stopped, the run( ) method completes execution and exits normally.

BRIEF DESCRIPTION OF THE DRAWINGS

Other objects and advantages of the invention will become apparent upon reading the following detailed description and upon reference to the accompanying drawings in which.

DETAILED DESCRIPTION OF THE PREFERRED EMBODIMENTS

One embodiment of the invention is described below. In this embodiment, a class is written to handle the threads which may be used in an application. (For the purposes of this disclosure, this class will be a referred to as the "Handler" class.) The threads are created using this class. When a thread needs to be stopped, a target variable defined in the class is set to indicate that the thread should be stopped. The thread periodically checks the target variable to determine whether or not it should stop. The target variable is checked by the thread when it is in a stable state so that, if the thread should be stopped, the run( ) method can complete execution and terminate normally rather than having to use the stop( ) method defined in the java.lang.Thread class.

Before describing the present mechanism, it may be helpful to describe the operation of a thread. As indicated above, a thread is a separate stream of execution that can take place independently from and concurrently with other streams of execution. A thread is created, then it runs, and then it dies. Execution of instructions within a thread may be suspended, or the thread may be put to sleep, blocked or made to yield to other threads, after which execution may continue. A thread may be terminated by completing its run( ) method, by another thread preempting it or by calling its stop( ) method.

Figure 1:
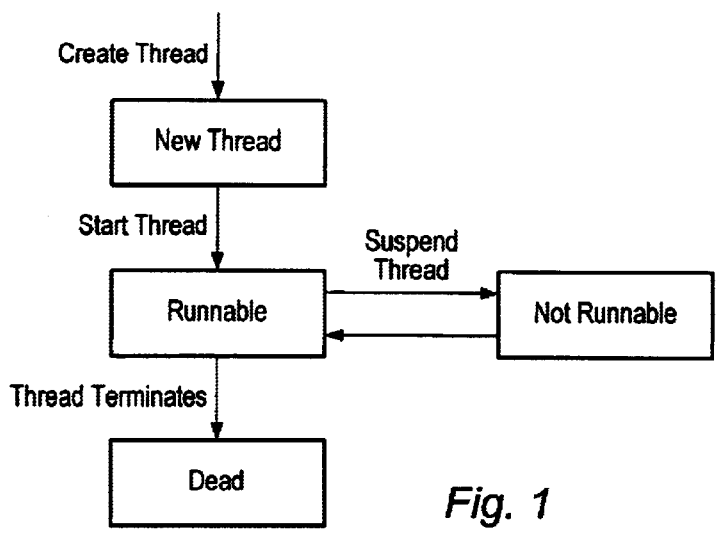
FIG. 1 is a diagram illustrating the life cycle of a Java thread.

Referring to FIG. 1, the life cycle of a Java thread is illustrated. While this figure is not a complete state diagram, it provides an overview of the life cycle of the thread. A thread can be created in either of two ways: it can extend the java.lang.Thread class; or it can implement the Runnable class. In the first instance, a class extends Thread:

```
class example1 extends Thread {
\\ overrides Thread.run( )
public void run( ) {
\\ example1 logic here
}
}
```

The example1 subclass extends the Thread class and inherits all of Thread's methods, except that example1 implements a run( ) metod that overrides the run( ) method of the Thread class. The examplel.start( ) method causes the Java virtual machine to execute example1.run( ) in a new thread of execution. In the second instance, a class implements Runnable:

```
class example2 implements Runnable {
\\ implements a run method
public void run( ) {
\\ example2 logic here
}
}
```

In order to implement Runnable, the example2 class must provide a run( ) method. The example2 class must also implement start( ) and stop( ) methods, because there is no reference in this class to the Thread class, so these methods are not inherited from the Thread class.

The creation of the thread places the thread in the New Thread state. In this state, the thread is simply an empty Thread object. No resources have been allocated for the thread. Once the thread has been created, it can be started using the start( ) method. The start( ) method allocates the system resources which are necessary to run the thread and schedules the thread to be run. After the appropriate resources have been allocated and the thread has been scheduled, the start( ) method signals the virtual machine to schedule the thread to run (by being placed on the run queue). When cpu resource is available, the run( ) method is executed. (It should be noted that the run( ) method is never explicitly called by an application, but is instead called by the start( ) method.)

After the thread has been started, it can be considered to be running. A running thread can be in a "runnable" state, or in a "not-runnable" state. (The "runnable" state described here should not be confused with the java.lang.Runnable interface.) That is, the thread may be currently able to execute instructions (i.e., it may be runnable,) or it may not be currently able to execute instructions and (i.e., it may be not-runnable.) Because several threads may have been started on a computer having a single processor (which can only execute one thread at a time,) some of the threads which are runnable may not actually be executing. These threads many instead be waiting to be executed by the processor.

Threads which are in the "not-runnable" state, on the other hand, will not be executed even if a processor is available to execute them. Several events may cause the threads to be not-runnable. For example, if a thread's sleep( ) method is invoked, that thread will wait for a designated amount of time before continuing execution. In another instance, if a thread's suspend( ) method is invoked, execution of the thread will be discontinued until its resume( ) method is called. A thread may also be in the not-runnable. state if it is blocked while waiting for I/O. It should be noted that, when these threads are once again runnable, they may not actually begin execution if a processor is not available.

If a thread is stopped, it is in the "dead" state. A dead thread cannot resume execution in the same manner as a not-runnable thread, but it can be re-started. Execution of a thread may be stopped in several ways. Preferably, a thread stops when execution of its run( ) method has completed (i.e., if there are no more instructions to be executed.) There may also be instances in which it may be desirable to have a thread stop on demand. For example, it may be desirable to have a thread continue execution indefinitely and to stop when instructed to do so. The stop( ) method is provided for this purpose in the java.lang.Thread class. The Thread.stop( ) method, however, may cause the thread to be terminated when it is in an unstable state. This problem may be illustrated using FIG. 2.

Figure 2:
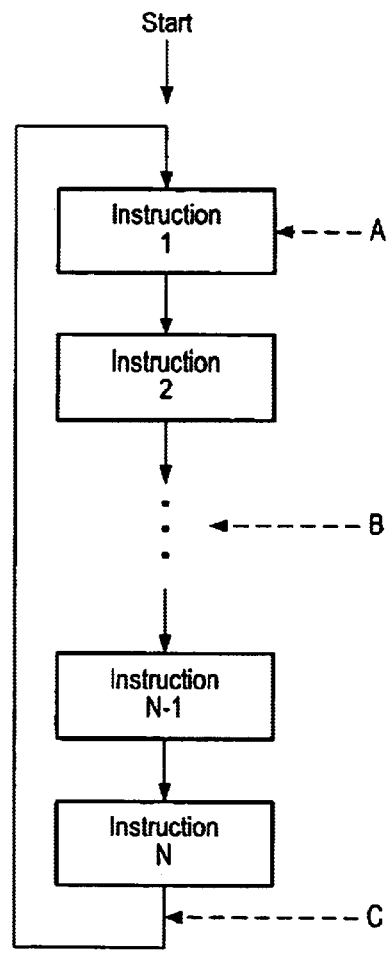
FIG. 2 is a flow diagram illustrating the execution of instructions in a thread and the stopping of the thread using the java.lang.Thread.stop( ) method.

Referring to FIG. 2, a flow diagram illustrating the execution of instructions in a thread is shown. In this example, the thread is configured to execute instructions 1–N, then loop back and repeat these instructions. The thread will continue to execute instructions 1–N until the thread is stopped. If the Thread.stop( ) method is invoked to stop the thread, it will immediately cause an exception and terminate the thread's execution. The stop( ) method is not constrained to halt execution of the thread at any particular point, so there is no way to determine where among these instructions execution will be stopped. The thread may be stopped at point A, point B, point C, or any other point in the execution of the thread's run( ) method. If the instructions modify the state of the application, stopping the thread may leave the application in an unknown state. The thread will also unlock all of the monitors which had been locked by the thread, possibly leaving objects protected by these monitors in inconsistent states. Objects which are left in these inconsistent states are said to be damaged, and operations on these damaged objects may lead to arbitrary behavior. Errors that are caused by the behavior of damaged objects may be difficult to detect and a user may have no warning that the errors have occurred.

It is therefore preferable to stop a thread by allowing it to complete the run( ) method. The present mechanism employs a target variable associated with the thread to provide a way to instruct the thread to stop, while allowing the run( ) method to complete execution. Essentially, the target variable provides an indication of whether the thread should continue to run or to stop. The thread periodically checks the target variable. If the target variable indicates that the thread should continue to run, execution of the thread proceeds normally. If the target variable indicates that the thread should stop, execution of the thread proceeds to the point at which the target variable is checked, then exits normally (i.e., completes the run( ) method.)

Figure 3:
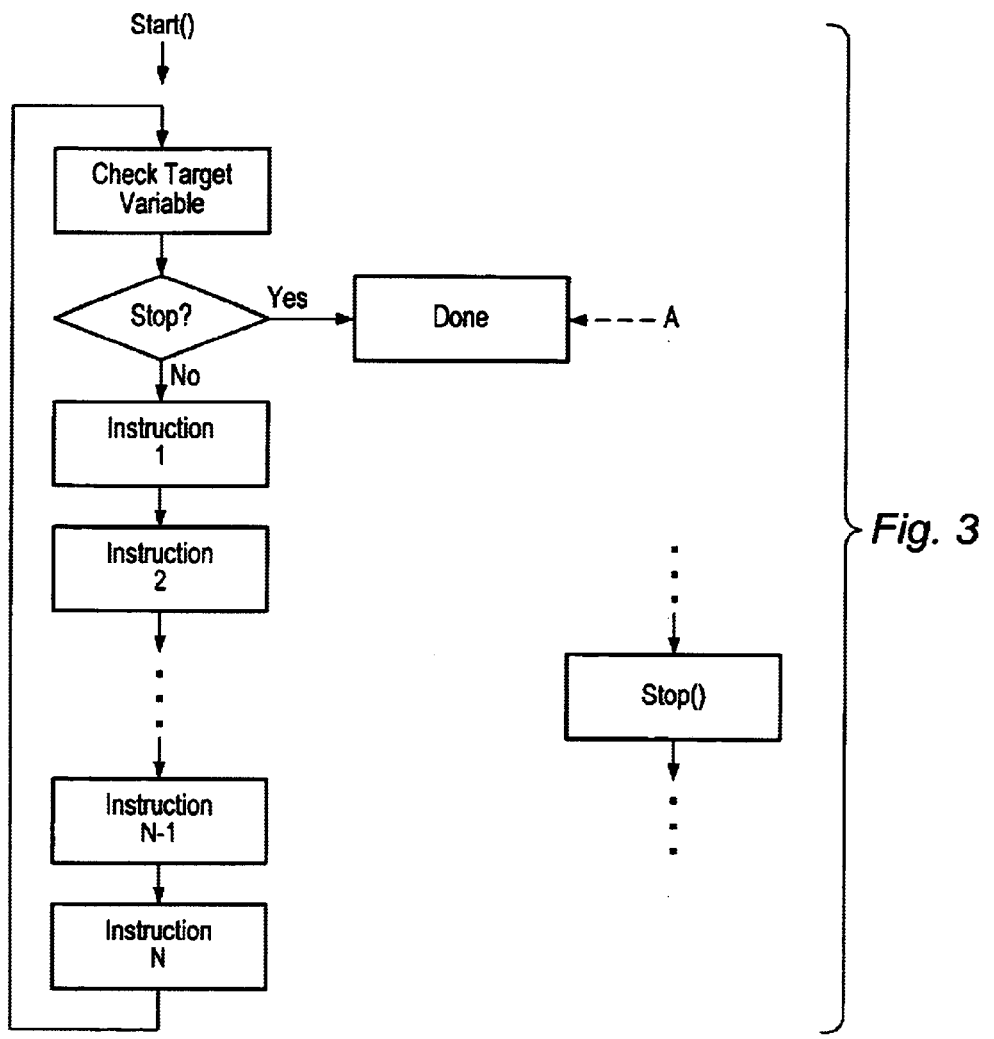
FIG. 3 is a flow diagram illustrating the execution of instructions in a thread and the stopping of the thread using the present mechanism.

Referring to FIG. 3, a flow diagram illustrating the execution of instructions in a thread using the present mechanism is shown. After the start( ) method is called, the body of the run( ) method is executed. The flow diagram on the left side of the figure represents body of the run( ) method. The thread is still configured to execute instructions 1–N, but it is further configured to periodically examine the target variable to determine its value (e.g., by using the isRunning( ) method described below.) If the target variable is set to indicate that the thread should continue running, instructions 1–N are repeated. If the target variable is set to indicate that the thread should be stopped (e.g., using the stop( ) method illustrated here as a different thread of execution,) the thread branches to point A, where it completes execution and exits normally. Because instructions 1–N are completed normally before the target variable is checked, the state of the application is easier to determine. Because the run( ) method executes to completion, no exception handling is required and no objects are damaged by abnormal termination of the thread. It should be noted that the target variable can be checked at different points in the code of the run( ) method. It should also be noted that the target variable can be set by other threads or by the run( ) method itself to indicate that the thread should be stopped.

The check of the target variable can easily be implemented in the run( ) method by enclosing the functionality of the run( ) method in a while loop:

```
public void run( ) {
while(target_variable !=null) {
  \\ thread logic here
  . . .
}
}
```

In one embodiment, the present mechanism comprises the Handler class shown below.

```
public class Handler implements Runnable {
private Thread thread=null;
public void start( ) {
   if(thread==null) {
thread=new Thread(this);
thread.start( );
   }
}
public void stop( ) {
   thread=null;
}
public void run( ) {
}
public boolean isRunning( ) {
   return thread !=null;
}
public void finalize( ) {
   thread=null;
}
}
```

Figure 4:
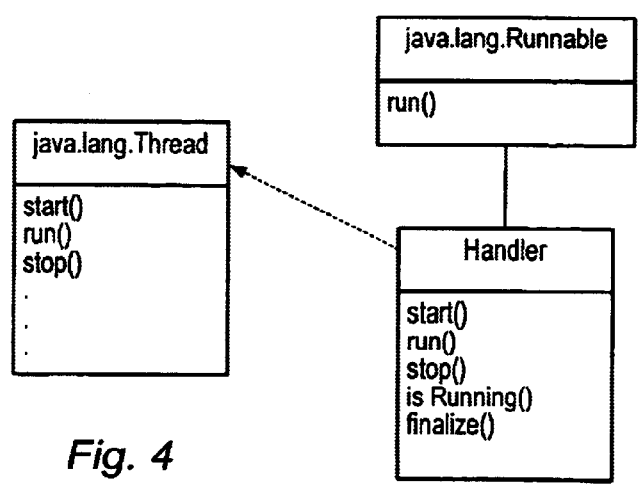
FIG. 4 is a diagram illustrating the relationships between a Handler class, the java.lang.Runnable interface and the java.lang.Thread class While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

Referring to FIG. 4, a diagram illustrating the relationships between the Handler class above, the Runnable interface and the java.lang.Thread class are shown. It can be seen from the figure that the Handler class implements the Runnable interface. Because the Handler class implements the Runnable interface, any class that extends the Handler class is also Runnable. Objects instantiated from such a class can therefore be referenced using the Runnable interface. While the Handler class implements the Runnable interface instead of extending the java.lang.Thread class, it references this class to create the threads.

In the example above, it can be seen that the run( ) method is implemented, but is empty. When a thread is needed to perform a particular function, a subclass that extends the Handler class is written. This subclass implements a run( ) method that overrides the run( ) method of the Handler class and provides functional code to be executed by the thread.

The stop( ) method of the Handler class provides a means for gracefully terminating the thread and should not be overridden by the second class. By providing an indication that the thread should be stopped rather than simply stopping the thread using the stop( ) method of the thread class, the instability inherent in the Thread.stop( ) method is avoided. The thread does not immediately throw an exception (unlocking monitors as the exception propagates up the stack,) but instead allows the thread to terminate normally, leaving the system in a stable state.

The Handler class example above also defines an isRunning( ) method that enables the thread to determine locally whether the thread should continue to run. The isRunning( ) method returns "true" if the thread should continue to run, and returns "false" if it should be stopped. Because the isRunning( ) method references only the thread itself, there is no need to reference Thread.currentThread( ). (It should be noted that current.Thread is static, so it is implied that there is only one current thread at any point in time. In a multi-processor environment, several threads may be running at one time, so the result of current.Thread becomes uncertain. Current.Thread may therefore prevent scaling of applications and should not be used.)

The Handler class above further defines a finalizes method. This method is included in the class for the purpose of cleaning up. In a Java virtual machine, the garbage collector calls the finalize( ) method to set the thread equal to null before deallocating the thread's resources. It should be noted that the policy for each garbage collector may vary, so the point at which finalize( ) is called may vary from one to another.

The Handler class described above thereby provides the following advantages: first, it gracefully handles stopping a thread without exception handling; second, classes which extend the Handler class implement the Runnable interface and can be referenced as Runnable; third, it can be determined locally within a thread whether the thread should continue to run, or should be terminated, based on the result of the isRunning( ) method; and fourth, because this class has such a simple API, it provides a suitable core for Java servers, agents and socket handlers to handle asynchronous peer communications. The Handler class thereby provides a means for standardization in the handling of threads which is object oriented, which uses self-contained logic, and which allows developers to use programming techniques with which they are already familiar. (It should be noted that other embodiments may vary from the implementation described above and may therefore provide advantages which differ from those listed here.)

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A system, comprising:
   a dedicated Java thread handler class which includes:
      a start method that sets a target variable to indicate that a thread extending said dedicated Java thread handler class is running;
      an abstract run method; and
      a stop method that sets said target variable to indicate that said thread extending said Java class is to be stopped;
   wherein said dedicated Java thread handler class is configured to be extended by custom thread subclasses that each includes a run method that overrides said abstract run method of said Java class, wherein said dedicated Java thread handler class does not include functionality particular to any of the custom thread subclasses, wherein said run method of one of the custom thread subclasses:
      provides one or more instructions to be executed within said thread, wherein said instructions are configured to access one or more objects during execution of said thread;
      provides one or more checks during execution of said thread to determine if said target variable indicates that said thread is to be stopped; and
      completes execution of said run method if one of the one or more checks determines that said thread is to be stopped;
   wherein completing execution of said run method if one of the one or more checks determines that said thread is to be stopped stops the thread without throwing an exception and leaves each of said one or more objects in a consistent state.

2. The system of claim 1, wherein said dedicated Java thread handler class implements the Java Runnable interface, and wherein an object instantiated from said Java class is configured to invoke methods defined by said Runnable interface.

3. The system of claim 1, wherein said dedicated Java thread handler class defines an additional method, wherein said additional method returns "true" if a corresponding thread is running and "false" if said corresponding thread is to be stopped.

4. The system of claim 3, wherein said one or more checks access said additional method to determine if said thread is to be stopped.

5. The system of claim 1, wherein said target variable is settable by the ran method to indicate that said thread is to be stopped.

6. The system of claim 1, wherein said target variable is settable by other threads to indicate that said thread is to be stopped.

7. The system of claim 1, wherein said dedicated Java thread handler class is configured to be extended to generate one or more subclasses in a plurality of Java applications, wherein each of said one or more subclasses in each of the plurality of Java applications is configured to be instantiated as one or more objects in the Java application, and wherein the one or more objects are configured to be executed as threads of the Java application.

8. The system of claim 1, wherein each of the threads of the Java application is configured to leave the Java application in a known state after termination of execution of the thread.

9. A method, comprising:
   defining a dedicated Java thread handler class wherein said dedicated Java thread handler class defines a first method that initializes a target variable to indicate that a thread extending said dedicated Java thread handler class is running, wherein said dedicated Java thread handler class defines a second method that sets said target variable to indicate that said thread extending said dedicated Java thread handler class is to be stopped;
   instantiating an object that inherits said methods from said dedicated Java thread handler class, wherein said object includes a run method implementing one or more instructions to perform a particular task, wherein is said dedicated Java thread handler class does not include any instructions for said particular task;
   creating a custom thread in which said one or more instructions are executed; starting said custom thread;
   calling said first method to initialize said target variable;
   initiating execution of said run method in said custom thread;
   calling said second method during execution of said run method to indicate that said custom thread is to be stopped;
   said run method detecting that said target variable is set to indicate that said custom thread is to stopped; and
   completing execution of said run method after said detecting;
   wherein said completing execution of said run method stops the custom thread without throwing an exception and leaves one or more objects accessed by the custom thread in a consistent state.

10. The method of claim 9, wherein said dedicated Java thread handler class implements the Java Runnable interface.

11. The method of claim 9, wherein said dedicated Java thread handler class defines an additional method, wherein said additional method returns "true" if a corresponding thread is running and "false" if said corresponding thread is to be stopped.

12. The method of claim 11, wherein said run method detecting that said target variable is set to indicate that said custom thread is to be stopped comprises accessing said additional method to determine if said custom thread is to be stopped.

13. A computer-readable storage medium containing a plurality of program instructions, wherein said program instructions define a method comprising:

defining a dedicated Java thread handler class wherein said dedicated Java thread handler class defines a first method that initializes a target variable to indicate that a thread extending said dedicated Java thread handler class is running, wherein said dedicated Java thread handler class defines a second method that sets said target variable to indicate that said thread extending said dedicated Java thread handler class is to be stopped;

instantiating an object that inherits said methods from said dedicated Java thread handler class, wherein said object includes a run method implementing one or more instructions to perform a particular task, wherein is said dedicated Java thread handler class does not include any instructions for said particular task;

creating a custom thread in which said one or more instructions are executed;

starting said custom thread;

calling said first method to initialize said target variable;

initiating execution of said run method in said custom thread;

calling said second method during execution of said run method to indicate that said custom thread is to be stopped;

said run method detecting that said target variable is set to indicate that said custom thread is to be stopped; and completing execution of said run method after said detecting;

wherein said completing execution of said run method stops the custom thread without throwing an exception and leaves one or more objects accessed by the custom thread in a consistent state.

14. The storage medium of claim 13, wherein said dedicated Java thread handler class implements the Java Runnable interface.

15. The storage medium of claim 13, wherein said dedicated Java thread handler class defines an additional method, wherein said additional method returns "true" if a corresponding thread is running and "false" if said corresponding thread is to be stopped.

16. The storage medium of claim 15, wherein said run method detecting that said target variable is set to indicate that said custom thread is to be stopped comprises accessing said additional method to determine if said custom thread is to be stopped.

17. A system, comprising:

a dedicated Java thread handler class which includes:

a start method that sets a target variable to indicate that threads extending said dedicated Java thread handler class are running, an abstract run method, and a stop method that sets said target variable to indicate that said threads extending said Java class am to be terminated;

wherein said dedicated Java thread handler class is configured to be extended by custom thread subclasses each including a run method that overrides said abstract run method, wherein said dedicated Java thread handler class does not include functionality particular to any of the custom thread subclasses, wherein each run method provides code to be executed by a thread implementing a particular one of the subclasses including said run method; and wherein, during execution of said thread, if said target variable is set to indicate that said thread is to be terminated, said run method is configured to complete execution to terminate the thread normally.

18. The system of claim 17, wherein, to terminate the thread normally, no exceptions are thrown and one or more objects accessed by said thread are left in a consistent state.

19. The system of claim 17, wherein, to terminate the thread normally, a Java application in which the thread is configured to execute is left in a known state.

20. The system of claim 17, wherein said dedicated Java thread handler class is configured to be extended to generate subclasses in a plurality of Java applications, wherein each of said subclasses in each of the plurality of Java applications is configured to be instantiated as one or more objects in the Java application, and wherein the one or more objects are configured to be executed as threads of the Java application.

21. The system of claim 20, wherein each of the threads of the Java application is configured to leave the Java application in a known state after termination of execution of the thread.

22. The system of claim 17, wherein said dedicated Java thread handler class implements the Java Runnable interface and wherein objects instantiated from said subclass are configured to invoke methods defined by said Runnable interface.

23. A method, comprising:

starting execution of a custom thread which implements a subclass of a dedicated Java thread handler class, wherein said dedicated Java thread handler class includes a start method that initializes a target variable to indicate that said custom thread is running and a stop method that sets said target variable to indicate that said custom thread is to be stopped, and wherein said subclass includes a run method that includes code executed by said custom thread, wherein the thread handler class does not include functionality particular to the custom thread;

calling said stop method during execution of said custom thread to indicate that said custom thread is to be stopped;

said run method detecting that said target variable is set to indicate that said custom thread is to be stopped; and completing execution of said run method after said detecting;

wherein said completing execution of said run method after said detecting stops the custom thread without throwing an exception and leaves objects accessed by the custom thread in a consistent state.

24. The method of claim 23, wherein said dedicated Java thread handler class implements the Java Runnable interface, and wherein an object instantiated from said subclass is configured to invoke methods defined by said Runnable interface.

* * * * *

UNITED STATES PATENT AND TRADEMARK OFFICE
CERTIFICATE OF CORRECTION

PATENT NO. : 6,711,739 B1
DATED : March 23, 2004
INVENTOR(S) : Jeffrey M. Kutcher It is certified that error appears in the above-identified patent and that said Letters Patent is hereby corrected as shown below:

Column 7,
Lines 46 and 47, please insert -- a processor; said processor causing execution of: --.

Column 8,
Line 23, please delete "ran" and insert -- run -- in place thereof.
Line 53, between "wherein" and "said", please delete "is".

Column 9,
Line 29, between "wherein" and "said", please delete "is".
Lines 62 and 63, please insert -- a processor; said processor causing execution of: --

Column 10,
Line 2, please delete "am" and insert -- are -- in place thereof..

Signed and Sealed this

Fifth Day of October, 2004

JON W. DUDAS
*Director of the United States Patent and Trademark Office*